(12) United States Patent
Hsu et al.

(10) Patent No.: US 10,627,581 B2
(45) Date of Patent: Apr. 21, 2020

(54) FIBER OPTIC CONNECTOR

(71) Applicants: Gloriole Electroptic Technology Corp., Kaohsiung (TW); SHEN ZHEN WONDERWIN TECHNOLOGY CO., LTD., Shenzhen, Guangdong Province (CN)

(72) Inventors: Shu-Hui Hsu, Kaohsiung (TW); Yen-Chang Lee, Kaohsiung (TW)

(73) Assignees: GLORIOLE ELECTROPTIC TECHNOLOGY CORP., Kaohsiung (TW); SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/255,190

(22) Filed: Jan. 23, 2019

(65) Prior Publication Data
US 2019/0227240 A1    Jul. 25, 2019

(30) Foreign Application Priority Data

Jan. 24, 2018    (TW) .............................. 107201167 U

(51) Int. Cl.
G02B 6/38    (2006.01)

(52) U.S. Cl.
CPC .......... *G02B 6/3831* (2013.01); *G02B 6/387* (2013.01); *G02B 6/3825* (2013.01); *G02B 6/3851* (2013.01); *G02B 6/3885* (2013.01); *G02B 6/3893* (2013.01); *G02B 6/3895* (2013.01); *G02B 6/3898* (2013.01)

(58) Field of Classification Search
None
See application file for complete search history.

(56) References Cited

U.S. PATENT DOCUMENTS

| 9,851,512 | B2* | 12/2017 | Chang | G02B 6/3821 |
|---|---|---|---|---|
| 2011/0019962 | A1* | 1/2011 | Childers | G02B 6/3869 385/76 |
| 2012/0099822 | A1* | 4/2012 | Kuffel | G02B 6/383 385/78 |
| 2013/0322825 | A1* | 12/2013 | Cooke | G02B 6/3851 385/59 |
| 2014/0331464 | A1* | 11/2014 | Jiang | G02B 6/3893 29/283 |
| 2015/0010276 | A1* | 1/2015 | Good | G02B 6/3831 385/78 |
| 2016/0327756 | A1* | 11/2016 | Raven | G02B 6/3893 |
| 2016/0327757 | A1* | 11/2016 | Lee | G02B 6/3893 |
| 2017/0276886 | A1* | 9/2017 | Lin | G02B 6/3893 |
| 2018/0024300 | A1* | 1/2018 | Wu | G02B 6/3636 385/39 |

(Continued)

*Primary Examiner* — Tina M Wong

(57) ABSTRACT

A fiber optic connector includes a plug body, a rear sleeve unit and a front sleeve unit. The plug body has first and second recesses. The rear sleeve unit is detachably sleeved around a rear part of the plug body, and has a key. The front sleeve unit is sleeved on of the plug body in front of the rear sleeve unit and detachably connected to the rear sleeve unit. The rear sleeve unit is changeable between a first position, in which the rear sleeve unit is attached to the plug body with the key being engaged with the first recess, and a second position in which the rear sleeve unit is attached to the plug body with the key being engaged with the second recess.

7 Claims, 10 Drawing Sheets

(56) References Cited

U.S. PATENT DOCUMENTS

| | | | |
|---|---|---|---|
| 2018/0217338 A1* | 8/2018 | Takano | G02B 6/3887 |
| 2018/0217339 A1* | 8/2018 | Ma | G02B 6/3893 |
| 2019/0227240 A1* | 7/2019 | Hsu | G02B 6/3851 |
| 2019/0278028 A1* | 9/2019 | Higley | G02B 6/3817 |

* cited by examiner

FIBER OPTIC CONNECTOR

CROSS-REFERENCE TO RELATED APPLICATION

This application claims priority of Taiwanese Patent Application No. 107201167, filed on Jan. 24, 2018.

FIELD

The disclosure relates to a fiber optic connector, and more particularly to a fiber optic connector useful for high speed data communication fiber optic networks.

BACKGROUND

As shown in FIG. 1, an existing fiber optic connector 1, such as an MPO connector, is connected to a fiber optic adaptor 2 of a terminal system (not shown). The fiber optic connector 1 includes a main body 11, a casing sleeve 12 sleeved on the main body 11, and two springs 13 (only one is visible in FIG. 1) each disposed between the main body 11 and the casing sleeve 12. The main body 11 has two spaced-apart lateral plates 111 respectively adjacent to the springs 13, two connection plates 112 each of which is connected between the lateral plates 111, two recesses 113 (only one is shown) each of which is formed in an outer surface of the lateral plates 111 and extends rearwardly from a front end of the same, a key 114 protruding from one of the connection plates 112, and two engagement grooves 115 (only one is shown) each of which is formed in the outer surface of one of the lateral plates 111 and disposed rearwardly of one of the recesses 113. The casing sleeve 12 is movable back and forth between an initial position, and a connection position. When the casing sleeve 12 is in the initial position, the springs 13 are not compressed by the casing sleeve 12 and the casing sleeve 12 covers the engagement grooves 115. When the casing sleeve 12 is in the connection position, the springs are compressed by the casing sleeve 12 and the casing sleeve 12 uncovers the engagement grooves 115.

The fiber optic adaptor 2 includes an inner surrounding surface 21, a connection hole 200 bounded by the inner surrounding surface 21, two engagement bumps 22 disposed respectively on two opposite sides of the inner surrounding surface 21 and facing each other, and a keyway 23 indented into the inner surrounding surface between the two opposite sides of the inner surrounding surface 21. When the main body 11 extends into the connection hole 200 of the fiber optic adaptor 2 to connect the fiber optic connector 1 to the fiber optic adaptor 2, the key 114 of the main body 11 extends into the keyway 23, and the engagement bumps 22 respectively slide in the recesses 113 of the main body 11 until they abut and push the casing sleeve 12 to the connection position. When the engagement bumps respectively engage the engagement grooves 115 of the main body 11, the existing fiber optic connector 1 is connected to the fiber optic adaptor 2.

To insert the fiber optic connector 1 into the connection hole 200, the protruding direction of the key 114 of the main body 11 must allow the key 114 to mate with the keyway 23; otherwise, the main body 11 will be unable to enter the connection hole 200. In FIGS. 1 and 2, there are shown two different fiber optic adaptors 2 having the same specification, but with their keyways 23 located at different positions. In consideration of mateability with different fiber optic adaptors 2 and matchability with different arrangements of optical fibers the fiber optic connector 1 are provided with different types for respectively mating with the two fiber optic adaptors 2 as shown in FIGS. 1 and 2. Manufacturing two types of the fiber optic connectors 1 needs to design different molds, thereby increasing costs. In addition, because the fiber optic connector 1 is limited to be mated to a particular type of the fiber optic adaptor 2, installation efficiencies and cabling of fiber optic network are adversely affected.

Further, the fiber optic network is generally arranged in a limited space. For installing a dense arrangement of fiber optic cables in the limited space, there is a need to miniaturize the existing fiber optic connector 1.

SUMMARY

Therefore, an object of the disclosure is to provide a fiber optic connector that is suitable for mating with a fiber optic adaptor and that can alleviate at least one of the drawbacks of the prior art.

According to the disclosure, a fiber optic connector is suitable for mating with a fiber optic adaptor, which has an inner surrounding surface, a connection hole surrounded by the inner surrounding surface, and a keyway indented in the inner surrounding surface. The fiber optic connector includes a plug body, a rear sleeve unit and a front sleeve unit.

The plug body includes top and bottom outer surfaces, two lateral outer surfaces each of which is connected between the top and bottom surfaces, a first recess extending in the top outer surface along a front-rear direction of the plug body, and a second recess extending in the bottom outer surface along the front-rear direction.

The rear sleeve unit is detachably sleeved around a rear part of the plug body. The rear sleeve unit includes two base plates, two connection plates, and a key. The base plates engage respectively the top and bottom outer surfaces. Each of the connection plates is connected between the base plates and overlies one of the lateral outer surfaces. The key protrudes forwardly from a front end of one of the base plates to extend along and engage one of the first and second recesses, and is configured for insertion into the keyway of the fiber optic adaptor.

The front sleeve unit is sleeved on the plug body in front of the rear sleeve unit and detachably connected to the rear sleeve unit. The front sleeve unit extends across and embraces the key.

The rear sleeve unit is changeable between a first position, in which the rear sleeve unit is attached to the plug body with the key being engaged with the first recess, and a second position in which the rear sleeve unit is attached to the plug body with the key being engaged with the second recess.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
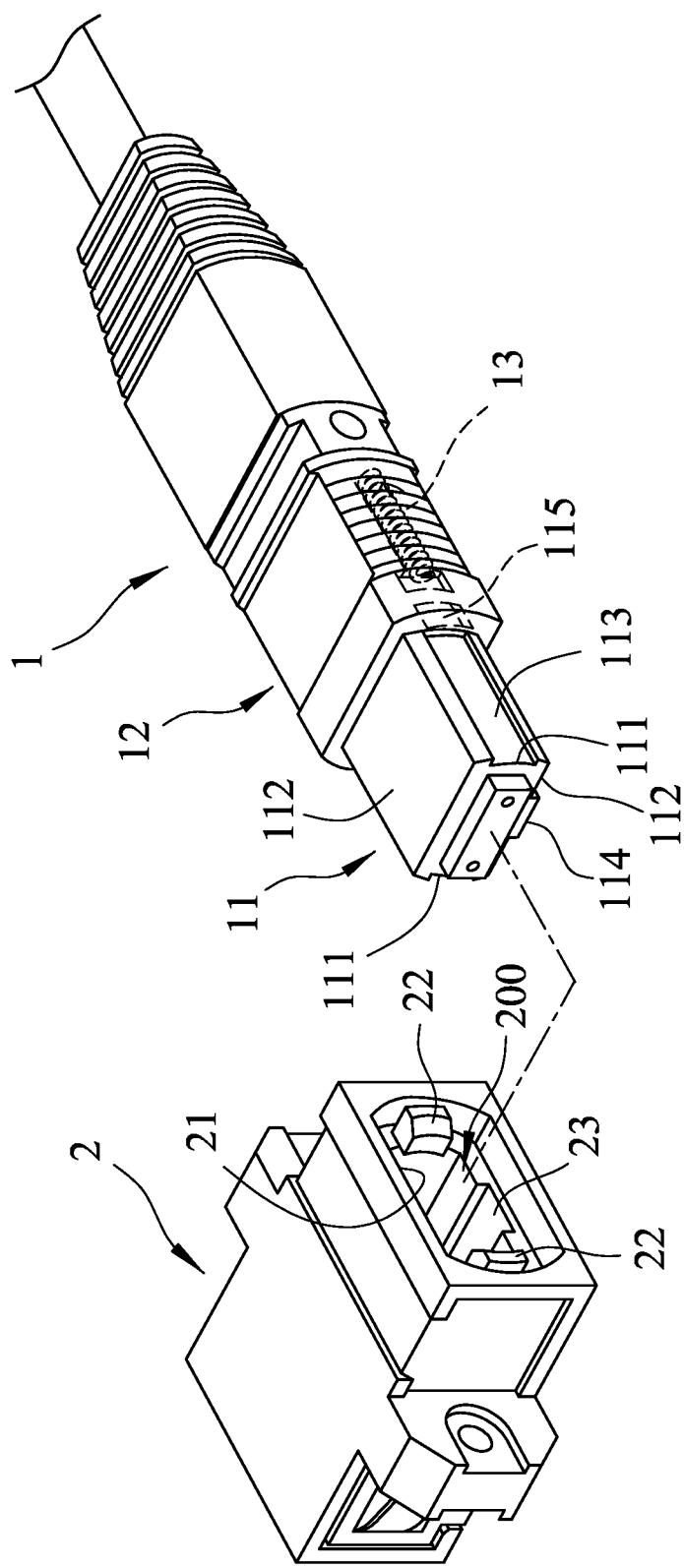
FIG. 1 is a perspective view illustrating an existing fiber optic connector to be mated to a fiber optic adaptor.
Figure 2:
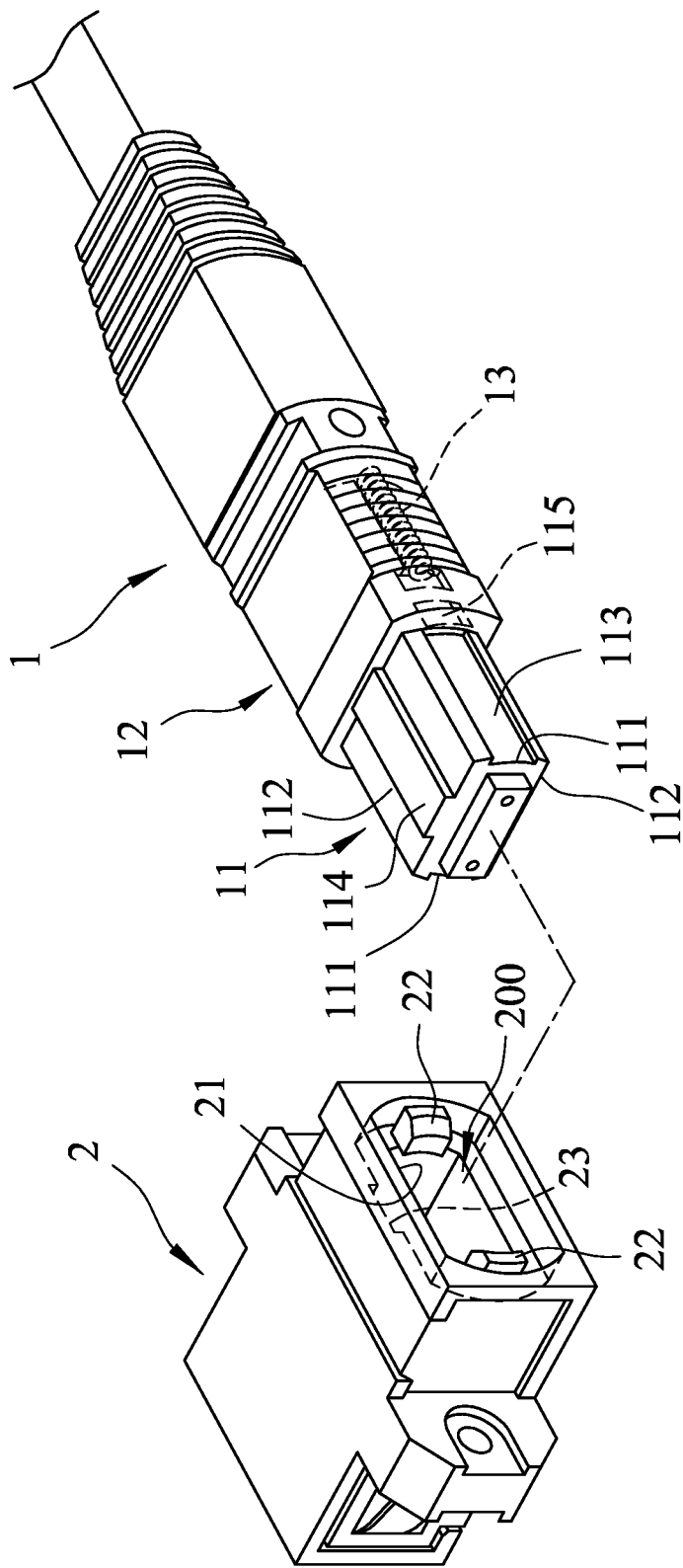
FIG. 2 is a perspective view illustrating another existing fiber optic connector with a different key orientation for mating with another fiber optic adaptor.
Figure 3:
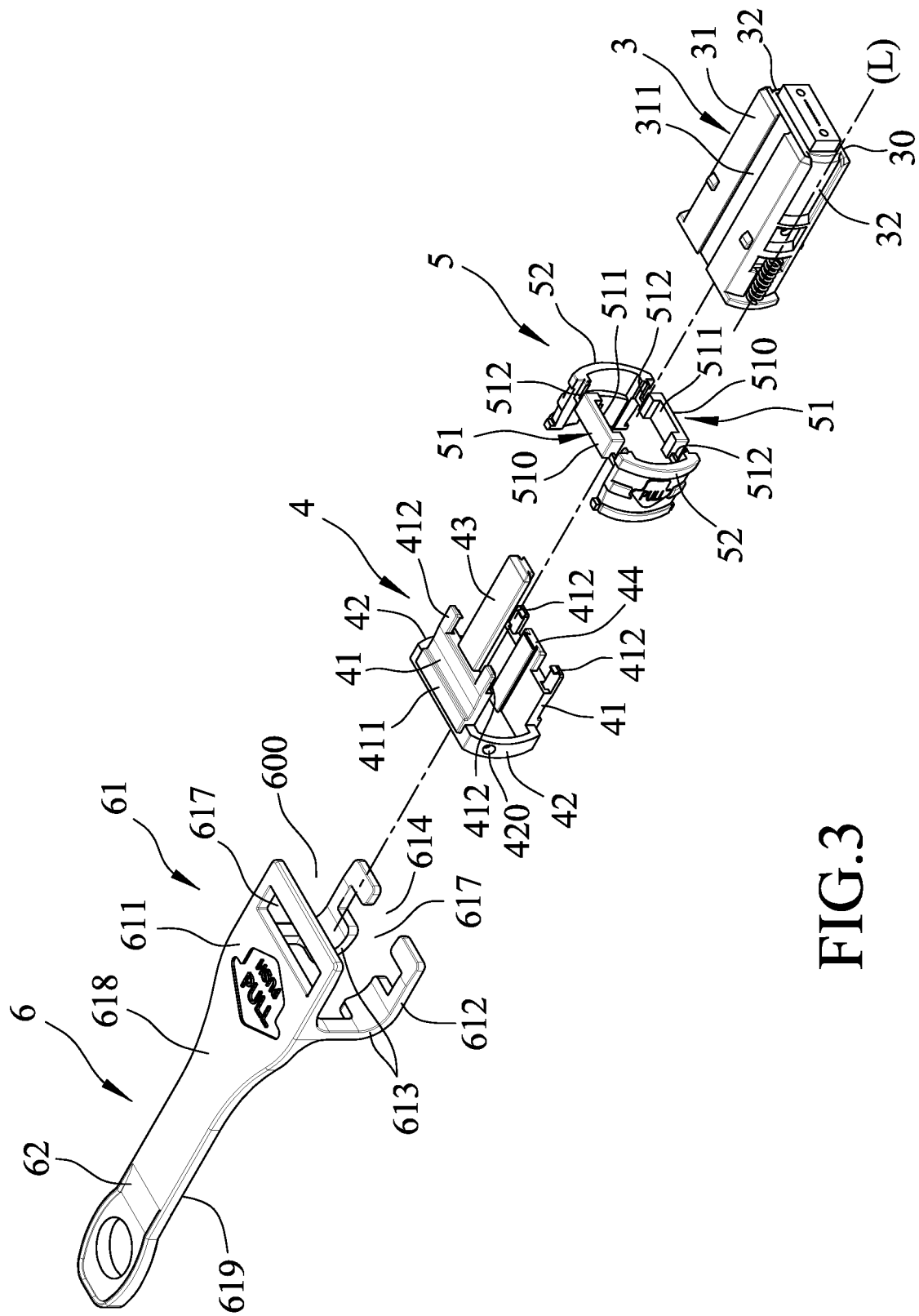
FIG. 3 is an exploded perspective view illustrating an embodiment of a fiber optic connector according to the disclosure.
Figure 9:
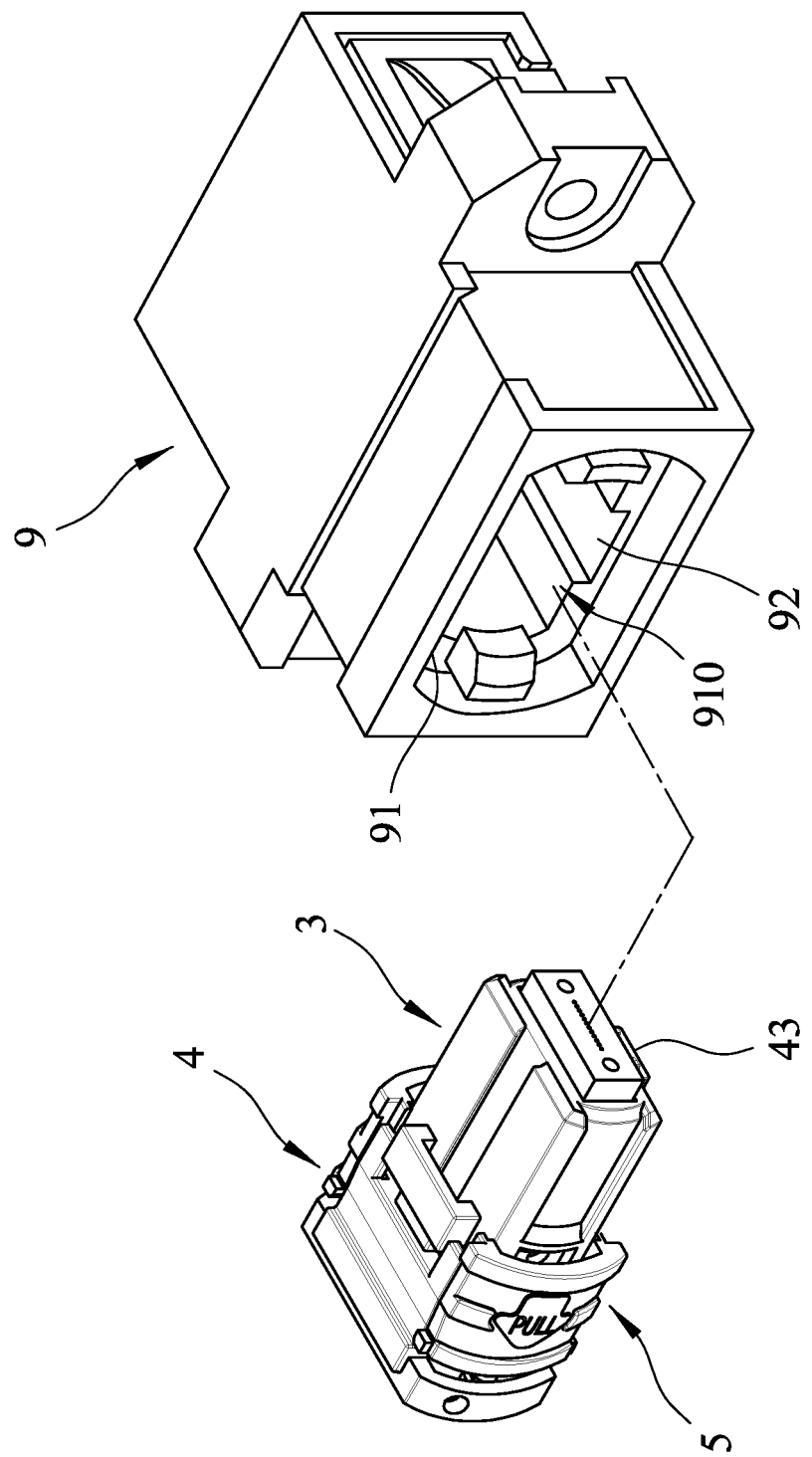
FIG. 9 is a perspective view illustrating the fiber optic connector to be mated to another fiber optic adaptor when the rear sleeve unit is in the second position.
Figure 10:
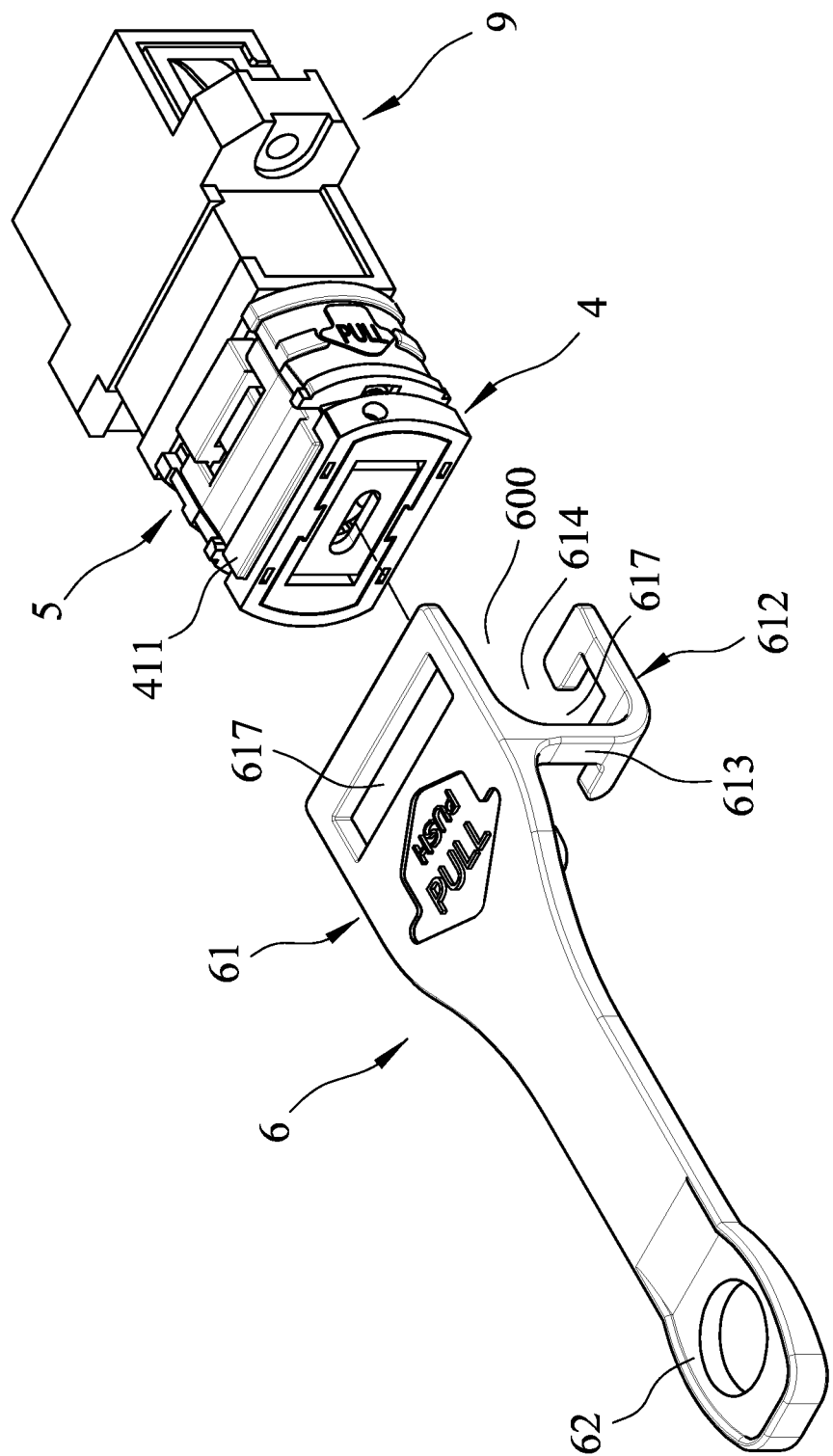
FIG. 10 is similar to FIG. 4, but taken from another view.

FIG. 3 illustrates an embodiment of a fiber optic connector according to the disclosure for mating with a fiber optic adaptor 9 (see FIGS. 9 to 10). The fiber optic adaptor 9 includes an inner surrounding surface 91, a connection hole 910 surrounded by the inner surrounding surface 91, and a keyway 92 indented in the inner surrounding surface 91. The fiber optic connector of the disclosure includes a plug body 3, a rear sleeve unit 4, a front sleeve unit 5 and a gripping unit 6.

Figure 4:
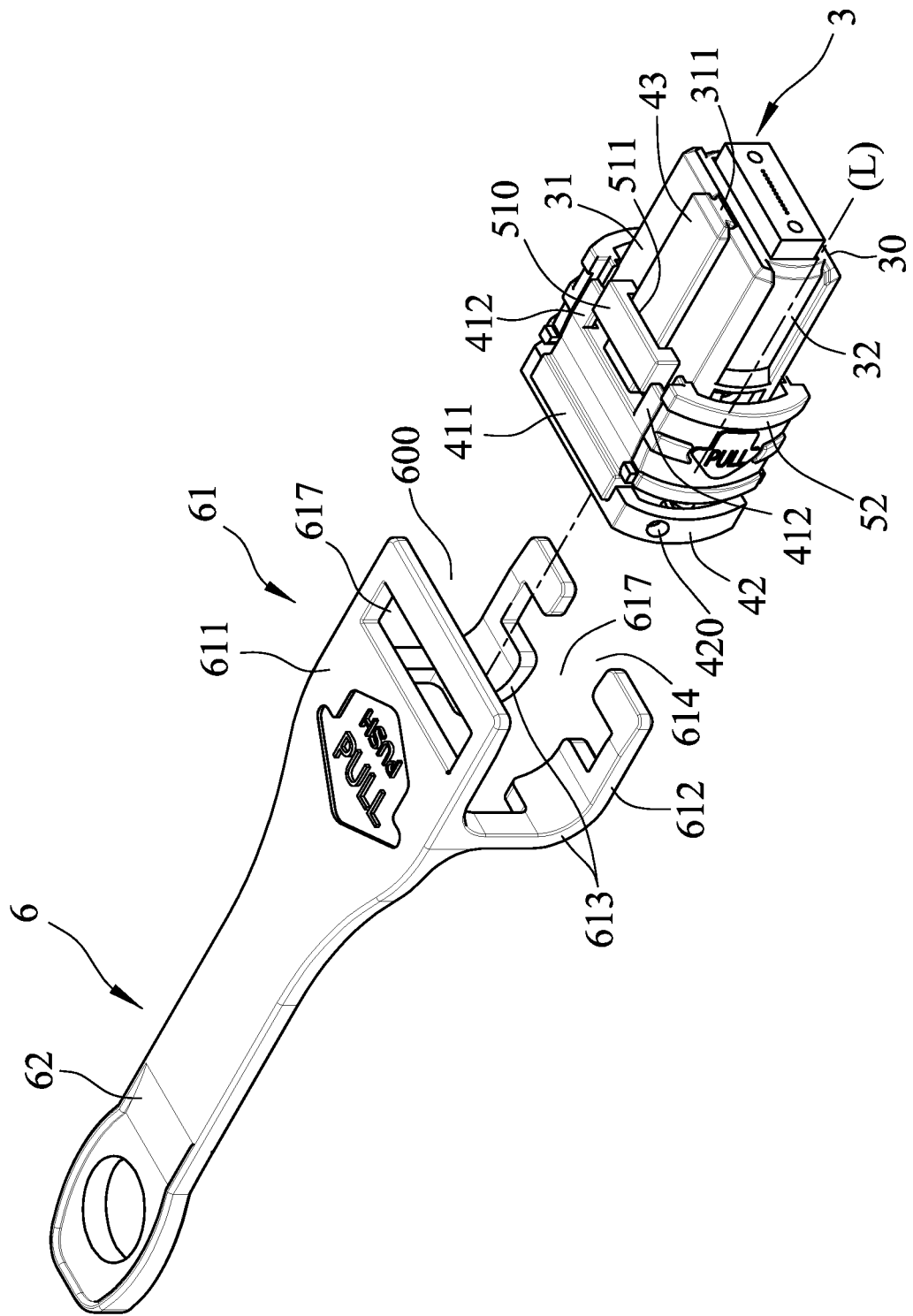
FIG. 4 is a partially exploded perspective view of the embodiment, illustrating a plug body, a rear sleeve unit and a front sleeve unit of the fiber optic connector in an assembled state.

Referring to FIG. 4, in combination with FIG. 3, the plug body 3 includes top and bottom outer surfaces 31, 30, two lateral outer surfaces 32 each of which is connected between ends of the top and bottom outer surfaces 31, 30, a first recess 311 extending in the top outer surface 31 along a front-rear direction of the plug body, and a second recess 312 extending in the bottom outer surface 30 along the front-rear direction. Each of the lateral outer surfaces 32 is provided with two different colors, one of the colors (i.e., an upper color) being provided above a longitudinal center line (L) (see FIG. 4) passing through the respective lateral outer surface 32, and the other one of the colors (i.e., a lower color) being provided below the longitudinal center line (L). The two lateral outer surfaces 32 have the same upper color and the same lower color. When the fiber optic connector of the disclosure is mated to the fiber optic adaptor 9, because the plug body 3 is inserted into the connection hole 910 of the fiber optic adaptor 9 connected to a terminal system (not shown), the optical fibers in the plug body 3 can be connected to the terminal system (not shown) through the fiber optic adaptor 9.

Figure 6:
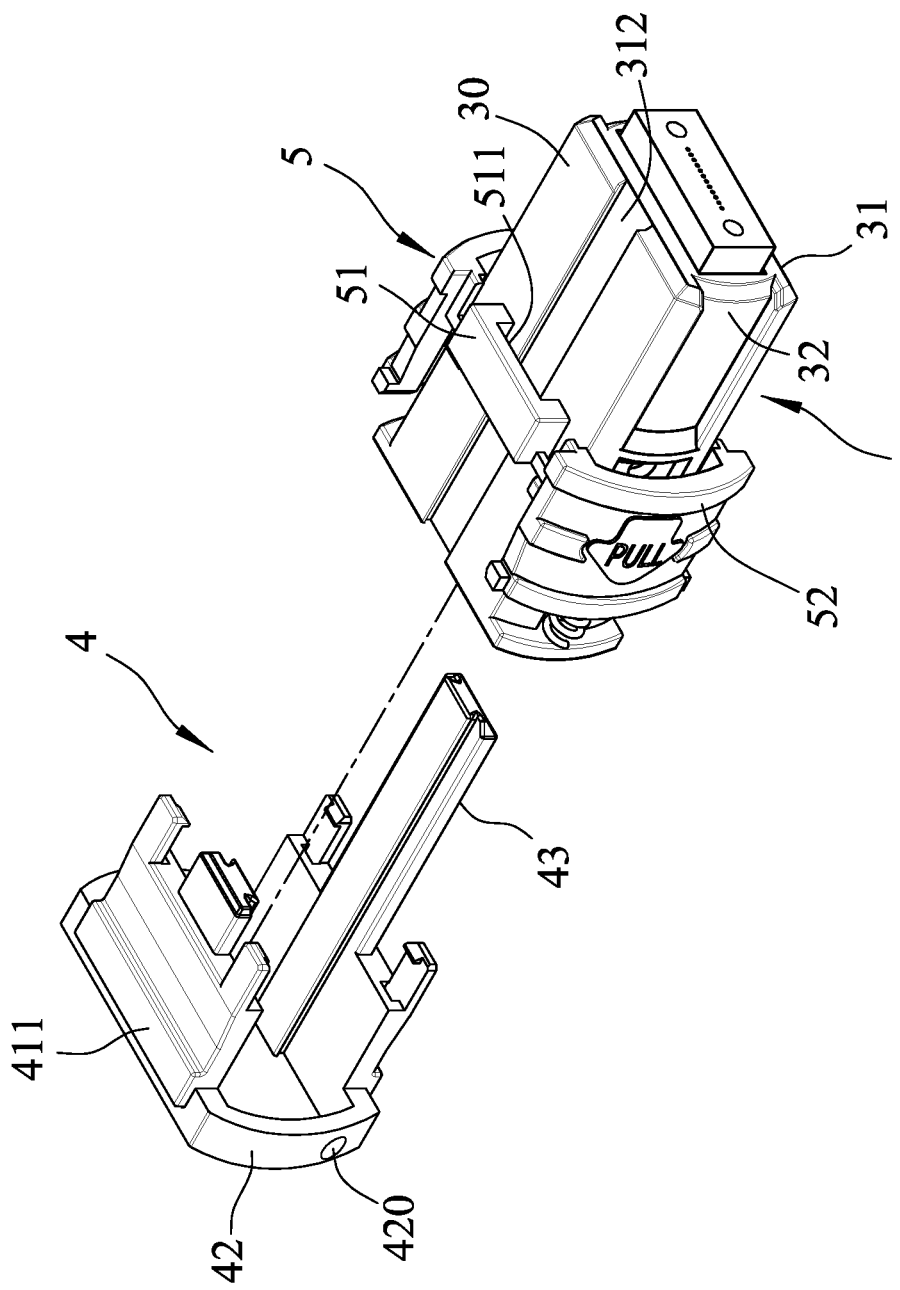
FIG. 6 is a perspective view illustrating the rear sleeve unit placed in a second position for assembly with the plug body.

The rear sleeve unit 4 is detachably sleeved around a rear part of the plug body 3. The rear sleeve 4 includes two base plates 41, two connection plates 42, and a key 43. The base plates 41 engage respectively the top and bottom outer surfaces 31, 30 of the plug body 3. Each of the base plates 41 has a linking portion 411 and two hook portions 412. The hook portions 412 are spaced apart from each other in a direction transverse to the front-rear direction of the plug body 3 and extends forwardly from a front end of the respective base plate 41. In this embodiment, each of the linking portions 411 is a protrusion proximal to a rear end of the respective base plate 41. Each of the connection plates 42 is connected between the base plates 41 and overlies one of the lateral outer surfaces 32, and has an identification hole 420 (only one is shown). The key 43 protrudes forwardly from the front end of one of the base plates 41 to extend along and engage one of the first and second recesses 311, 312, and is configured for insertion into the keyway 92 of the fiber optic adaptor 9. An engaging tongue 44 protrudes from the other base plate 41 for engaging the other one of the first and second recesses 311, 312. The engaging tongue 44 is shorter than the key 43. The rear sleeve unit 4 is changeable between a first position in which the rear sleeve unit 4 is attached to the plug body 3 with the key 43 being engaged with the first recess 311 (see FIGS. 3, 4), and a second position in which the rear sleeve unit 4 is attached to the plug body 3 with the key 43 being engaged with the second recess 312 (FIG. 6).

The identification holes 420 of the connection plates 420 are offset from the longitudinal center lines (L) of the lateral outer surfaces 32 such that the identification holes 420 are proximal to one of the top and bottom outer surfaces 31, 30 of the plug body 3. In FIG. 4, the rear sleeve unit 4 is in the first position, and the identification holes 420 are proximal to the top outer surface 31. Therefore, the upper color i.e., one of the colors above the longitudinal center lines (L), of the lateral outer surfaces 32 is visible through the identification holes 420 of the connection plates 42 when the rear sleeve unit 4 is in the first position. The lower color, i.e., the other one of the colors below the longitudinal centerlines (L), of the lateral outer surfaces 32 is visible through the identification holes 420 of the connection plates 41 when the rear sleeve unit 4 is in the second position.

Figure 5:
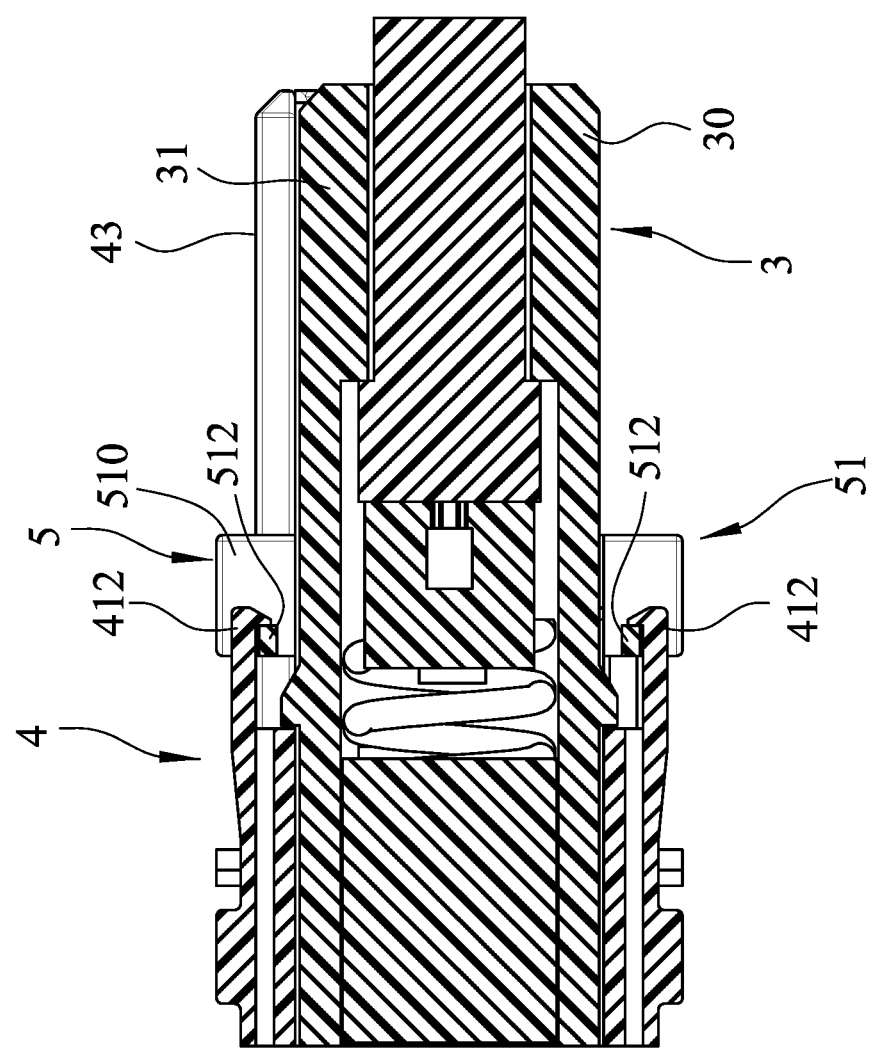
FIG. 5 is a sectional view of the assembly of the plug body, the rear sleeve unit and the front sleeve unit.

The front sleeve unit 5 is sleeved on of the plug body 3 in front of the rear sleeve unit 4 and detachably connected to the rear sleeve unit 4. The front sleeve unit 5 extends across and embraces the key 43. In this embodiment, the rear sleeve unit 5 includes top and bottom bridge plates 51 which respectively lie over the top and bottom outer surfaces 31, 30 of the plug body 3 and extend across the first and second recesses 311, 312 and each of which has a limiting groove 511 facing inward and toward the plug body 3, and two side panels 52 which are interconnected by the top and bottom bridge plates 51. The key 43 of the rear sleeve unit 4 extends through the limiting groove 511 of the top bridge plate 51 so that the key 43 is embraced by the top bridge plates 51. Referring to FIG. 5 in combination with FIGS. 3 and 4, each of the top and bottom bridge plates 51 further has a bridge portion 510 which defines the limiting groove 511, and two engaging portions 512 respectively disposed at two opposite sides of the limiting groove 511. The hook portions 412 are formed as notched portions and are respectively engaged with the engaging portions 512.

Figure 7:
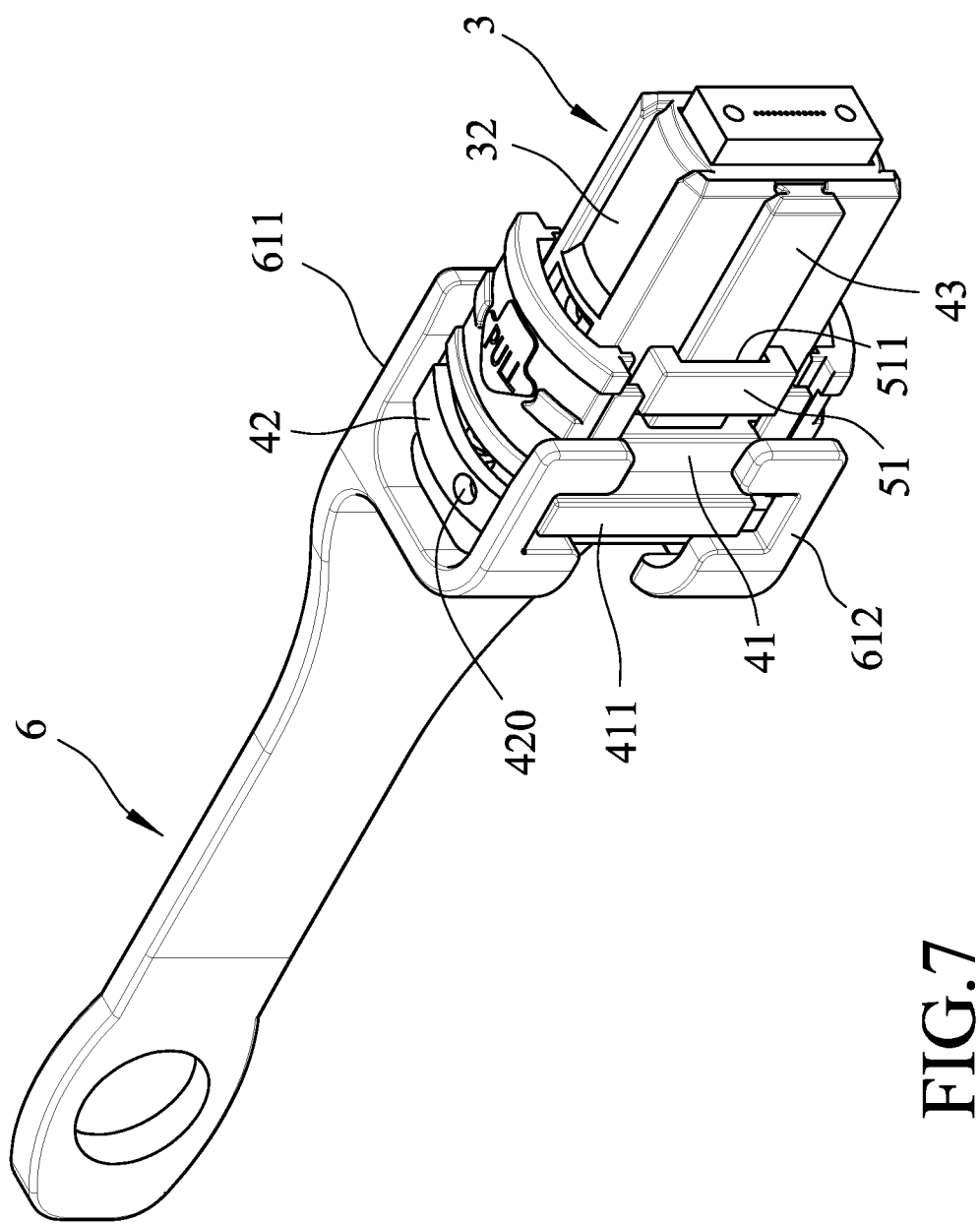
FIG. 7 is a perspective view of the embodiment illustrating a gripping unit holding the rear sleeve unit when the rear sleeve unit is in the second position.

The gripping unit 6 is removably disposed at a rear end of the rear sleeve unit 4, and includes a main body 61 and a grip 62. The main body 61 is connected to the linking portions 411 of the base plates 41. The main body 61 includes a top plate portion 611 having a top surface 618 and a bottom surface 619, a bent portion 612 that extends downwardly from the bottom surface 619 and thereafter bends forwardly to lie below the top plate portion 611, and two coupling portions 617 respectively formed in the top plate portion 611 and the bent portion 612 for being connected to the linking portions 411 of the base plates 41. The top plate portion 611 and the bent portion 612 are spaced apart from each other and cooperatively bound a clamping space 600 that opens in a forward direction for access by the rear sleeve unit 4. Referring to FIG. 7, to assemble the gripping unit 6 to the rear sleeve unit 4, the top plate portion 611 and the bent portion 612 respectively extend over the base plates 41 and engage the linking portions 411 of the base plates 41 through the coupling portions 617. Further, each of the coupling portions 617 is a hole, so that the linking connection portions (the protrusions) 411 of the base plates 41 can be respectively interlocked with the coupling portions 617.

Note that the bent portion 612 is arranged to include two spaced apart L-shaped bent plates 613 both of which extend downwardly from the top plate portion 611 and bend forward to lie below the top plate portion 611. The hole of the coupling portion 617 of the bent portion 612 is formed below the hole of the coupling portion 617 of the top plate portion 611 and between the L-shaped bent plates 613. Front ends of the L-shaped bent plates 613 define an opening gap 614 in communication with the coupling portion 617.

Because the rear sleeve unit 4 and the front sleeve unit 5 are separate pieces, the rear sleeve unit 4 and the front sleeve unit 5 can be separately manufactured together with their structural details. Compared with the existing fiber optic connector 1 having a one-piece structure of the casing sleeve 12, the fiber optic connector of the disclosure is relatively beneficial for miniaturization. The structural details formed in the one-piece structure of the prior art may be shared by the two-parts designs of the rear and front sleeve units 4, 5 of the disclosure. In a practical implementation, a length of the fiber optic connector of the disclosure can be reduced to 16 millimeters. Due to the reduced size, the fiber optic connector of the disclosure is advantageous for installation of a dense network arrangement in a limited space.

Referring to FIG. 6, the rear sleeve unit 4 is changed to the second position from the first position shown in FIG. 3. The position is changed after the rear sleeve unit 4 is turned 180 degrees or upside down. In the second position, the key 43 of the rear sleeve unit 4 engages the second recess 312 in the bottom outer surface 30. As such, the fiber optic connector of the disclosure is allowed to be mated to a different fiber optic adaptor 9. The identification holes 420 of the rear sleeve unit 4 are proximal to the bottom outer surface 30 of the plug body 3 and expose or present the lower color of the lateral outer surface 32 of the plug body 3, indicating that the rear sleeve unit 4 is placed in the second position.

Figure 8:
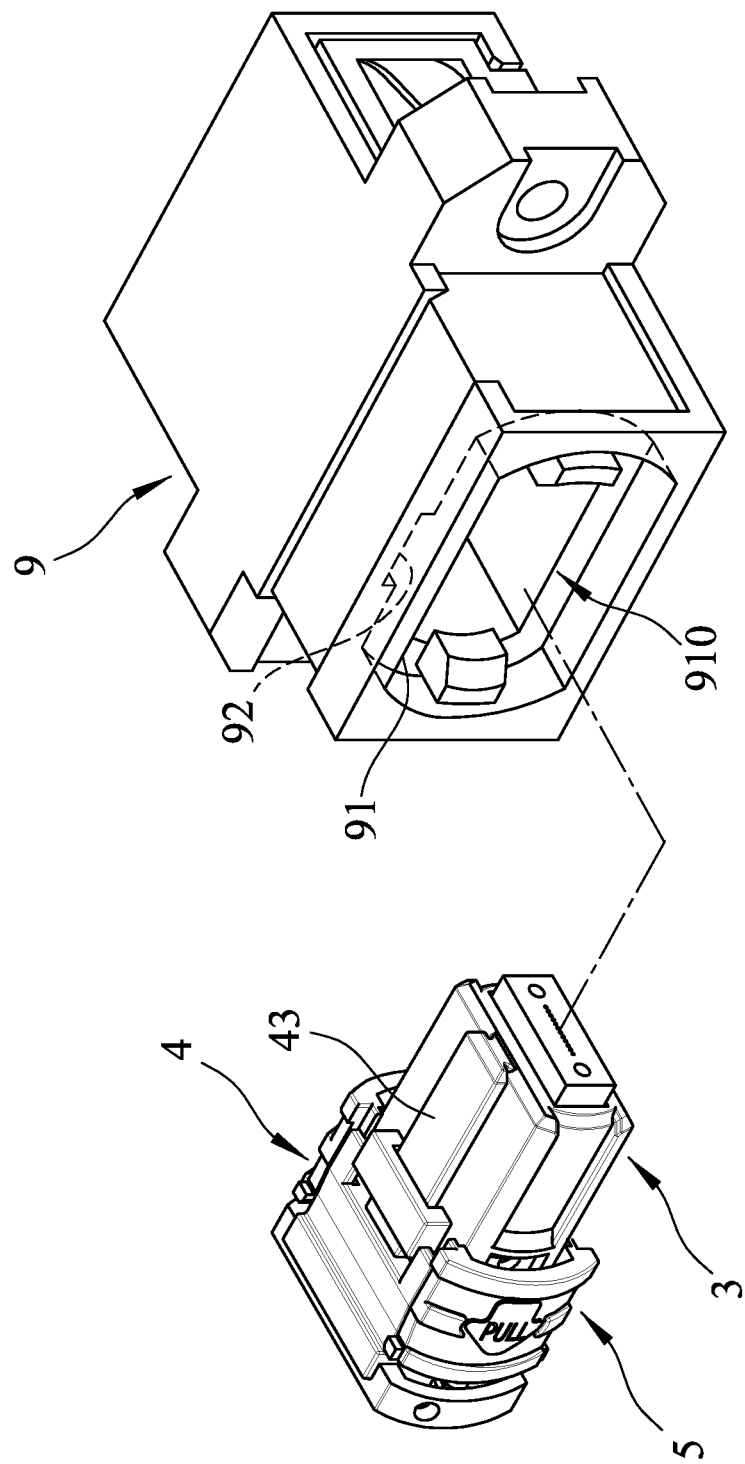
FIG. 8 is a perspective view illustrating the fiber optic connector to be mated to a fiber optic adaptor when the rear sleeve unit is in the first position.

Referring to FIG. 8, the rear sleeve unit 4 is placed in the first position, and is mated to a fiber optic adaptor 9 having the keyway 92 at the upper side of the connection hole 910.

Referring to FIG. 9, the rear sleeve unit 4 is placed in the second position, and is mated to another fiber optic adaptor 9 having the keyway 92 at the lower side of the connection hole 910.

The gripping unit 6 may be used for pushing the fiber optic connector into a fiber optic adaptor and/or pulling the same from the fiber optic adaptor. Referring to FIG. 10, the gripping unit 6 is used for pulling the fiber optic connector of the disclosure which has been mated to a fiber optic adaptor 9 (not shown). Because the clamping space 600 opens forward, it can be easily operated to hold the rear sleeve unit 4 by simply moving forward and toward the rear sleeve unit 4. The gripping unit 6 is fixed to the rear sleeve unit 4 when the linking portions 411 of the base plates 41 engage the coupling portions 617 of the main body 61. Therefore, even if a plurality of the fiber optic connectors of the disclosure are densely arranged in multiple arrays in a limited space, the fiber optic connector can be individually and conveniently removed from a respective fiber optic adaptor by placing the gripping unit 6 at the direct rear side of the fiber optic connector.

While the di s closure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector for mating with a fiber optic adaptor (9), which has an inner surrounding surface (91), a connection hole (910) surrounded by the inner surrounding surface (91), and a keyway (92) indented in the inner surrounding surface (91), the fiber optic connector comprising:
   a plug body (3) including top and bottom outer surfaces (31, 30), two lateral outer surfaces (32) each of which is connected between said top and bottom surfaces (31), a first recess (311) extending in said top outer surface (31) along a front-rear direction of said plug body (3), and a second recess (312) extending in said bottom outer surface (30) along the front-rear direction;
   a rear sleeve unit (4) detachably sleeved around a rear part of said plug body (3), said rear sleeve unit (4) including two base plates (41) engaging respectively said top and bottom outer surfaces (31, 30), each of said base plates (41) having a rear end and a linking portion (411) proximal to said rear end,
   two connection plates (42) each of which is connected between said base plates (41) and overlies one of said lateral outer surfaces (32), and
   a key (43) protruding forwardly from a front end of one of said base plates (41) to extend along and engage one of said first and second recesses (311, 312), and being configured for insertion into the keyway (92) of the fiber optic adaptor (9);
   a gripping unit (6) removably disposed on a rear end of said rear sleeve unit (4) and including a main body (61) connected to said linking portions (411) of said base plates (41), and a grip (62) extending rearward from said main body (61); and
   a front sleeve unit (5) sleeved on of said plug body (3) in front of said rear sleeve unit (4) and detachably connected to said rear sleeve unit (4), said front sleeve unit (5) extending across and embracing said key (43);
   wherein said rear sleeve unit (4) is changeable between a first position, in which said rear sleeve unit (4) is attached to said plug body (3) with said key (43) being engaged with said first recess (311), and a second position in which said rear sleeve unit (4) is attached to said plug body (3) with said key (43) being engaged with said second recess; and
   wherein said main body (61) includes a top plate portion (611) having a top surface (618) and a bottom surface (619), and a bent portion (612) that extends downwardly from said bottom surface (619) and thereafter bends forwardly to lie below said top plate portion (611), said top portion (611) and said bent portion (612) respectively extending over said base plates (41) and engaging said linking portions (411) of said base plates (41), said top portion and said bent portion (612) being spaced apart from each other and cooperatively bounding a clamping space (600) that opens in a forward direction for access by said rear sleeve unit (4).

2. The fiber optic connector as claimed in claim 1, wherein said gripping body (61) further includes two coupling portions (617) respectively connected to said linking portions (411) of said base plates (41).

3. The fiber optic connector as claimed in claim 2, wherein each of said linking portions (411) of said base plates (41) is a protrusion, each of said coupling portions (617) of said gripping body (61) being a hole.

4. The fiber optic connector as claimed in claim 1, wherein:
said gripping body (61) further includes two holes (617) respectively formed in said top plate portion and said bent portion and respectively connected to said linking portions (411) of said base plates (41);
said bent portion (612) includes two spaced apart L-shaped bent plates (613) both of which extend downwardly from said top plate portion 611 and bend forward to lie below said top plate portion 611;
said hole of said bent portion (612) is formed directly below said hole of said top plate portion (611) and between said L-shaped bent plates (613);
said L-shaped bent plates (613) having front ends which define an opening gap (614) in communication with said hole of said bent portion;
said linking portions (411) of said base plates (41) are protrusions interlockable with said holes.

5. The fiber optic connector as claimed in claim 1, wherein each of said connection plates (42) has an identification hole (420), each of said lateral outer surfaces (32) being provided with two different colors, one of said colors being visible through said identification hole (420) when said rear sleeve unit is in the first position, the other one of said colors being visible through said identification hole (420) when said rear sleeve unit is in the second position.

6. A fiber optic connector for mating with a fiber optic adaptor (9), which has an inner surrounding surface (91), a connection hole (910) surrounded by the inner surrounding surface (91), and a keyway (92) indented in the inner surrounding surface (91), the fiber optic connector comprising:
a plug body (3) including top and bottom outer surfaces (31, 30), two lateral outer surfaces (32) each of which is connected between said top and bottom surfaces (31), a first recess (311) extending in said top outer surface (31) along a front-rear direction of said plug body (3), and a second recess (312) extending in said bottom outer surface (30) along the front-rear direction;
a rear sleeve unit (4) detachably sleeved around a rear part of said plug body (3), said rear sleeve unit (4) including two base plates (41) engaging respectively said top and bottom outer surfaces (31, 30), two connection plates (42) each of which is connected between said base plates (41) and overlies one of said lateral outer surfaces (32), and a key (43) protruding forwardly from a front end of one of said base plates (41) to extend along and engage one of said first and second recesses (311, 312), and being configured for insertion into the keyway (92) of the fiber optic adaptor (9); and
a front sleeve unit (5) sleeved on of said plug body (3) in front of said rear sleeve unit (4) and detachably connected to said rear sleeve unit (4), said front sleeve unit (5) extending across and embracing said key (43);
wherein said rear sleeve unit (4) is changeable between a first position, in which said rear sleeve unit (4) is attached to said plug body (3) with said key (43) being engaged with said first recess (311), and a second position in which said rear sleeve unit (4) is attached to said plug body (3) with said key (43) being engaged with said second recess; and
wherein said front sleeve unit (5) includes top and bottom bridge plates (51), which respectively lie over said top and bottom outer surfaces (31) of said plug body (3) and extend across said first and second recesses (311, 312), and two side panels (52), each of said top and bottom bridge plates (51) having a limiting groove (511) facing inward and toward said plug body (3), said two side panels (52) being connected between said top and bottom bridge plates (51), said key (43) extending through said limiting groove (511) of one of said top and bottom bridge plates (51).

7. The fiber optic connector as claimed in claim 6, wherein each of said base plates (41) of said rear sleeve unit (4) has two hook portions (412) projecting forwardly therefrom and spaced apart from each other in a direction transverse to the front-rear direction of said plug body (3), each of said top and bottom bridge plates (51) further having two engaging portions (512) respectively disposed at two opposite sides of said limiting groove, said hook portions (412) being respectively engaged with said engaging portions (512).

* * * * *